Figure 1:
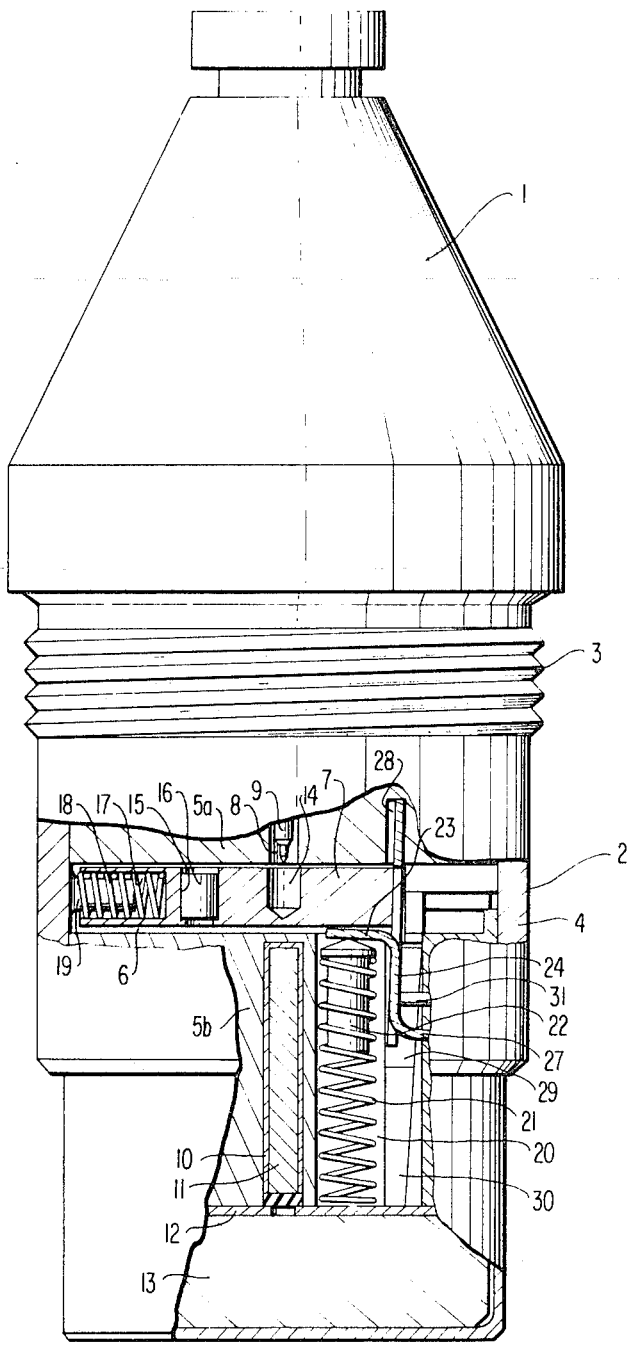

United States Patent [19]
Popper et al.

[11] 3,744,424
[45] July 10, 1973

[54] DEVICE FOR PROVIDING AN INDICATION OF THE DISTANCE TRAVELLED BY AN OBJECT UNDER CONDITIONS OF ACCELERATION

[75] Inventors: Jakhin Boaz Popper, Kiryat Motzkin; Raphael Cohen, Haifa, both of Israel

[73] Assignee: The State of Israel, Ministry of Defense, Hakirya Tel Aviv, Israel

[22] Filed: Aug. 5, 1970

[21] Appl. No.: 61,059

[52] U.S. Cl. ............... 102/78, 73/511, 102/76 P
[51] Int. Cl. ............................................. F42c 15/24
[58] Field of Search ............... 102/78, 79, 80, 82, 102/83, 84; 73/511

[56] References Cited
UNITED STATES PATENTS

| | | |
|---|---|---|
| 2,951,444 | 9/1960 | Hunt, Jr. et al.............. 102/78 |
| 3,613,594 | 10/1971 | Burke........................ 102/79 |
| 2,475,730 | 7/1949 | Wandrey..................... 102/78 X |
| 2,537,953 | 1/1951 | Andrews..................... 102/78 |
| 3,151,558 | 10/1964 | Lunati....................... 102/78 |

Primary Examiner—Samuel W. Engle
Attorney—Browdy & Neimark

[57] ABSTRACT

A device for providing an indication of the distance travelled by an object under conditions of acceleration comprising an elongated plate-like member which is longitudinally displaceable, under set back forces, in a direction opposite to that of said acceleration and with respect to a frame-like member fixed with respect to the object, spring biasing means for resisting the longitudinal displacement of said plate-like member and an abutment system associated with said members such that longitudinal displacement of the plate-like member is accompanied by a reciprocating, transverse displacement of the plate-like member.

8 Claims, 7 Drawing Figures

DEVICE FOR PROVIDING AN INDICATION OF THE DISTANCE TRAVELLED BY AN OBJECT UNDER CONDITIONS OF ACCELERATION

This invention relates to a device for providing an indication of the distance travelled by an object under conditions of acceleration, which term includes both positive and negative acceleration of a magnitude which exceeds that of $g$. The invention relates particularly to the use of such a device in the arming mechanism of a detonator fuse for a shell or like projectile.

The function of an arming device is to change the condition of a fuse from a safe condition to a state of readiness for functioning, i.e. for detonation. The latter takes place only after arming, whether in the air or on impact. Arming on the other hand is initiated with the projectile inside the launching weapon but safety conditions dictate that arming should under no circumstances be completed before the fuse (to be armed) has left the weapon.

The arming process with which the present invention is particularly concerned is one which is initiated when the fuse receives a triggering action, such as that obtained when the projectile is fired. The time interval during which the fuse changes from an unarmed to an armed condition is referred to as the arming delay. Among arming devices which have been proposed for this purpose are those which are designed to operate under the so-called "set back" forces which are developed as a result of the high acceleration of the projectile upon firing. With arming devices of this type, however, a problem arises in view of the fact that the firing conditions which give rise to the set back forces and which lead, after the arming delay, to the arming of the fuse can be simulated by extraneous circumstances, i.e. circumstances other than those of firing and thereby lead to an undesired arming of the fuse. Such circumstances include any wherein the projectile is subjected to high acceleration, e.g. as a result of a sudden impact or fall. A properly designed arming device of this type must be such that whilst it is capable of actuation under genuine firing conditions it will not be actuated as a result of such extraneous circumstances.

Any attempt to meet this requirement by ensuring that the device only responds to accelerations greater than a certain minimum value is not practicable seeing that in many cases the accelerations induced through firing can be quite low and of the same order as or even less than those induced by the extraneous circumstances referred to above and, obviously the arming device must be effective to ensure arming as a result of the operation of set back forces arising from such relatively low accelerations.

The present invention proposes to overcome this difficulty by utilizing, as the determining factor in the operation of the arming device, not the absolute magnitude of the acceleration which is developed but rather the integrated value of the acceleration over the time during which it is effective, i.e. the distance travelled by the projectile provided with the arming device when under conditions of acceleration above a certain minimum. Thus, with a device designed to operate on this basis it can be ensured that the arming delay involved corresponds to a distance travelled which is wholly outside the range which could be achieved as a result of accidental impact or fall.

It is an object of the present invention to provide a new, improved and simple device for providing an indication of the distance travelled by an object under conditions of acceleration and wherein due account has been taken of the considerations referred to above.

According to the present invention there is provided a device for providing an indication of the distance travelled by an object under conditions of acceleration comprising an elongated plate-like member which is longitudinally displaceable, under set back forces, in a direction opposite to that of said acceleration and with respect to a frame-like member fixed with respect to the object, spring biasing means for resisting the longitudinal displacement of said plate-like member and an abutment system associated with said members such that longitudinal displacement of the plate-like member is accompanied by a reciprocating, transverse displacement of the plate-like member.

It can be shown that with a device in accordance with the invention the restraining forces acting on the plate and inhibiting its longitudinal displacement under the set back forces are proportional to the square of the speed of the object. This fact can be shown to be particularly favourable when the device is incorporated in an arming device for a shell fuse or the like and it ensures that whilst the fuse becomes armed as a result of firing the shell and after leaving the launching weapon (within a wide range of firing accelerations) the dangers of accidental arming as a result of impact, fall or like extraneous circumstances are minimal. It will be understood, however, that the spring biasing means is designed to exert a restoring force on the plate which is less than the minimum set back forces which are exerted on the plate during firing acceleration thus restoring force ensuring that accelerations less than a certain minimum value will not be effective in initiating the displacement of the plate.

In accordance with a specific aspect of the present invention there is provided a set back arming device for use in a shell fuse or the like and including an elongated plate-like member which is longitudinally displaceable, under set back forces in a direction opposite to the direction of acceleration of the shell and with respect to a frame-like member fixed with respect to the fuse, spring biasing means for exerting a restoring force on said plate-like member less than the minimum set back forces exerted on the plate during firing, an abutment system associated with said members such that longitudinal displacement of the plate-like member is accompanied by a reciprocating transverse displacement thereof and retaining means for retaining said plate-like member in its displaced position when said displacement reaches a predetermined value.

With such an arming device the set back forces generated as a result of firing are such as to ensure the displacement of the plate-like member against the spring restoring force by said pre-determined value whereupon the plate-like member is retained in this position against a return displacement under the influence of the spring restoring force once acceleration has ceased. In this way the fuse becomes armed. Where, however, the set back forces are generated as a result of impact or other extraneous circumstances and are sufficiently strong to overcome the spring biasing force and cause displacement of the plate-like member the integrated value of the acceleration as represented by the displacement of the plate-like member is not sufficient to displace the latter by the predetermined value and thereby to cause retention of the plate-like member and therefore as soon as the acceleration ceases the plate-like member is restored by the spring biasing means to its original position and thus arming does not occur.

In accordance with a preferred embodiment of said invention said abutment system comprises a pair of parallel elongated serrated edges formed on one of said members and a pair of abutments carried by the other of said members and respectively and alternatingly adapted to abut said edges.

Figure 2:
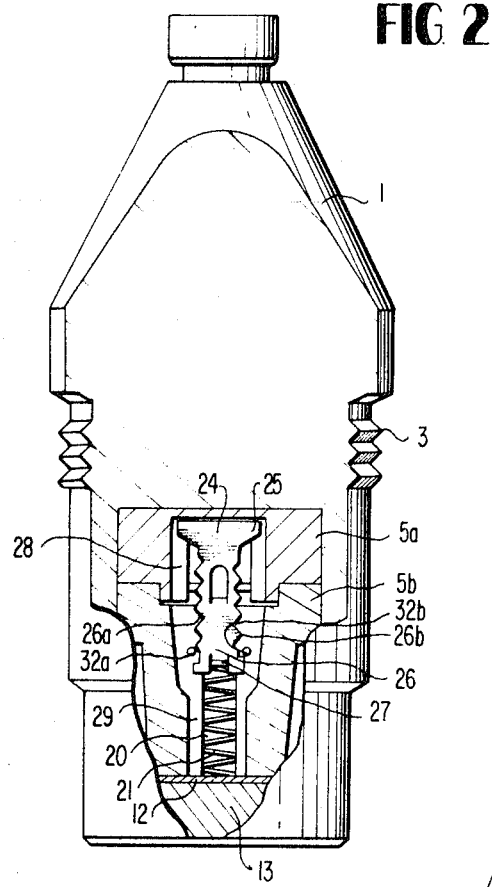
Figure 3:
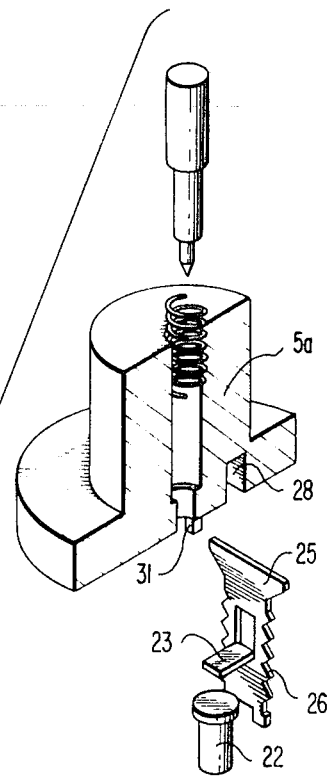
Figure 3:
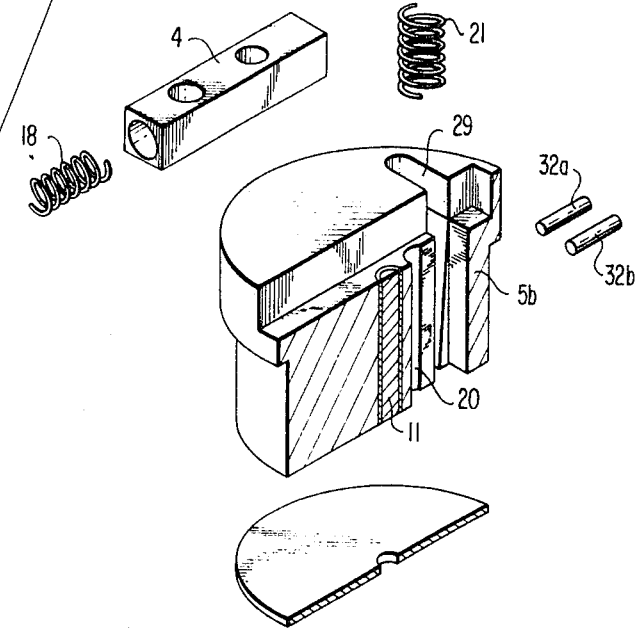
Figure 4A:
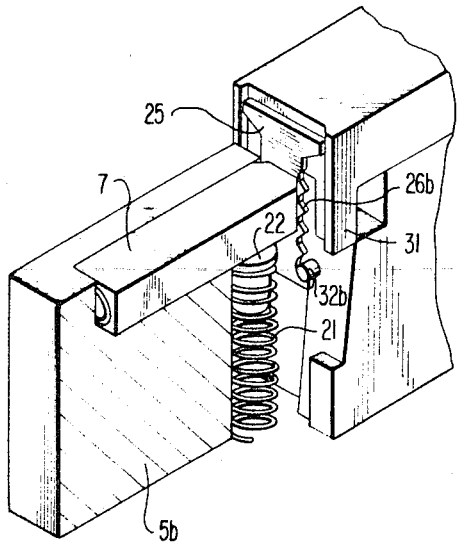
Figure 4B:
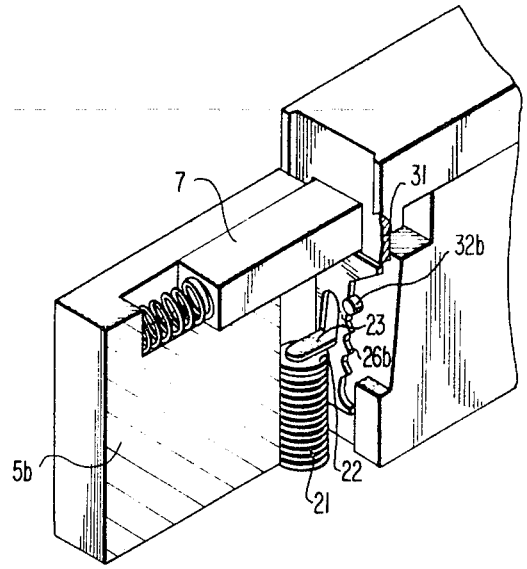
Figure 5A:
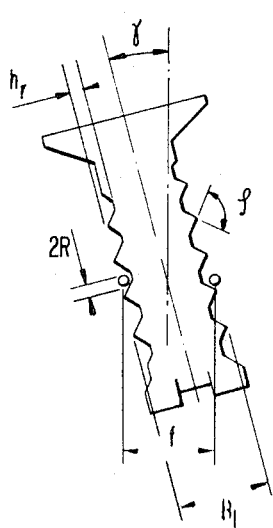
Figure 5B:
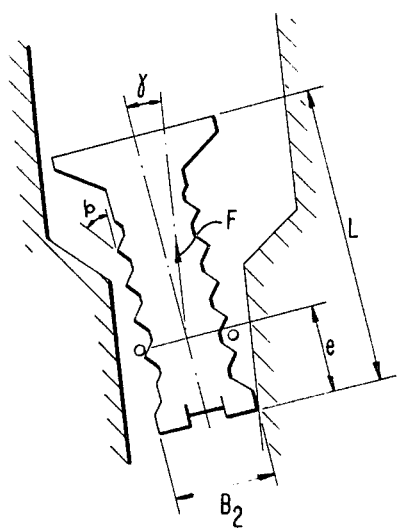

For a better understanding of the present invention and to show how the same may be carried out in practice reference will now be made to the accompanying drawings in which:

FIG. 1 is a partially sectioned front elevation of a shell fuse including a set back arming device in accordance with the invention, FIG. 2 is a longitudinally sectioned view of the shell shown in FIG. 1 taken along the line II—II, FIG. 3 is an exploded view (partially sectioned) of the arming device shown in FIGS. 1 and 2, FIGS. 4a and 4b are views of the arming device shown in FIGS. 1, 2 and 3 represented schematically before and after arming respectively, and FIGS. 5a and 5b are respective schematic representations of an arming plate designed to illustrate limiting locking conditions.

As seen in FIGS. 1 and 2 of the drawings the bomb fuse comprises a casing having a conical nose portion 1 and a substantially cylindrical body portion 2, a screw threaded portion 3 being formed at an intermediate position on the body portion 2 so as to enable the fuse to be screwed into the body of a shell (not shown).

Fitting inside the casing wall 4 of the cylindrical body portion 2 is a two piece slider housing 5a and 5b (see FIG. 3) which are super-imposed and are coupled together by appropriately inter-engaging projections and recesses (not shown). The housing parts 5a and 5b define between them an elongated transverse pathway 6 in which is slidable an elongated metallic slider 7.

The housing portion 5a has formed therein a central longitudinally directed striker pin aperture in which is slidable a striker pin 9 whilst aligned therewith in the lower housing portion 5b is a lead tube 10 accommodating a lead detonator 11, the base of the housing portion 5b is fitted with a disc 12 whose portion opposite the lead detonator 11 is apertured, the region between the disc 12 and the base of the cylindrical body portion of the fuse 2 being filled with a booster 13.

Formed in the slider 7 is a blind ended recess 14 which, in the unarmed position on the fuse is shown aligned with the striker pin 9. To the left of the blind recess 14 is a throughgoing aperture 15 filled with a detonator 16. The left-hand end of the slider is formed with a longitudinal recess 17 in which is located a compression spring 18 which bears at the right hand end on the base of the recess formed in the slider and on the left hand end of the neck of a cylindrical stud 19 formed integrally with the body casing 4 and projecting into the recess 17.

Adjoining the lead tube 2 and parallel thereto in the housing portion 5b is a tubular bore 20 in which is located a compression spring 21 whose lower end bears against the disc 12 and whose upper end surrounds the stem of a pressure stud 22.

The head of the pressure stud 22 is pressed against an outwardly extending tongue 23 of an arming plate 24 which, as seen in FIG. 1 of the drawings abuts the right hand end of the slider 7. As can be seen clearly in FIG. 2 of the drawings the arming plate 24 consists of an upper wide portion 25 which tapers uniformly to an elongated substantially rectangular portion 26, the longitudinal edges 26a and 26b of which are serrated, the crest of each serration of the edge 26 being laterally aligned with the recess of each serration on the edge 26b.

As indicated before the tongue 23 is stamped out of the plate 24 so as to extend normally therefrom whilst at the lower end of the plate 24 a second and smaller tongue 27 is stamped out of the plate 24 so as to extend normally therefrom in a direction opposite to that of the tongue 23.

As seen in FIG. 1 and 3 of the drawings, in the unarmed state of the fuse the upper portion of the plate including the wider element 25 thereof is located in a longitudinally directed slot 28 formed in the upper slider housing portion 5a, the central portion of the plate is located adjacent the right hand end of the slider 7 and prevents the displacement of the slider 7 to the right in the slider pathway under the influence of the compression spring 18. The lower portion of the plate is located in an enlarged, longitudinally directed slot 29, formed in the lower slider housing portion 5b adjacent the elongated aperture 20 and communicating therewith via a longitudinally directed slit 30 through which the tongue 23 projects and is slidable. As can be seen clearly in FIGS. 1 and 3 of the drawings the width of the slot 28 is greater than that of the plate 24 and in consequence, as a result of the turning moment exerted on the tongue 23 by the spring biased pressure stud 22, the plate 24 tends to pivot in a clockwise direction adopting the slightly inclined position shown in FIG. 1. At the same time the outer edge of the lower tongue 27 bears against the longitudinal wall of the recess 29 formed in the slider houser portion 5b.

Projecting downwardly from the slider housing portion 5a into an appropriate recess formed in the upper surface of the slider houser portion 5b, said recess merging into the elongated bore 29, are a pair of retaining legs 31.

Projecting transversely out of the slider houser 5b into the elongated recess 29 are a pair of abutment pins 32a and 32b, these pins being located adjacent the edges 26a and 26b of the plate 24 and in a widened portion 29a of the recess 29 said widened portion narrowing into a really relatively narrow portion 29b thereof.

In operation and with the arming plate 24 shown in the unarmed position as seen in FIGS. 1, 2 and 4a of the drawings, the fuse is unarmed and if for any reason the striking pin 9 is displaced downwardly it merely enters the blind recess 14 seeing that the stab initiated detonator 16 is displaced therefrom. When now the fuse as a whole is subjected to acceleration for whatever reason and the acceleration is such that the set back forces induced in the plate 24 are greater than the restoring force of the spring 21 these set back forces will result in the displacement of the plate 24 in a direction opposite to the direction of the acceleration and against the restoring force of the spring 21. The displacement, however, of the plate 24 in its longitudinal direction is also accompanied by a reciprocating displacement in a transverse direction as a result of the successive abutment of the abutment pins 32a and 32b with the crests of the serrations 26a and 26b, and, as indicated above, the displacement of the plate is in effect proportional to the square of the speed of propulsion of the fuse. The degree of displacement of the plate gives a measure of the the path length during which the fuse is subject to acceleration.

The design of the device is such that when the acceleration is of the kind induced by the firing of the shell this acceleration is of a sufficient magnitude and persists for a sufficient length of time for the plate to be displaced downwardly over substantially its full length until the lower end of the stem of the pressure stud 22 abuts against the disc 12 whereupon the turning moment imparted to the plate 24 pivots it underneath the retaining legs 31 thereby locking the plate in position and preventing its return movement under the influence of the restoring spring 20 even though the acceleration may have ceased (see FIG. 4b). Under these circumstances the fuse can be considered to be armed and the slider 7 can move to the right after (if necessary) a predetermined delay which is now initiated. With the completion of this delay the detonator 16, the striker pin 9 and the lead detonator 11 are aligned and upon detonation the striker pin 9 stabs the detonator 16 and the consequent detonation is transmitted to the booster 13 resulting in the detonation of the fuse and the explosion of the shell.

If, on the other hand the set back forces induced in the plate 24 arise out of acceleration of the fuse resulting from an impact or other extraneous circumstance these accelerations will not be of sufficient magnitude and/or of sufficient duration for the plate 24 to be fully displaced downwardly (as in FIG. 4b) until its upper edge can be retained by the retaining legs which would lead to the arming of the fuse and therefore, when the acceleration induced by these extraneous circumstances ceases to be effective, the plate is restored to its original position by the restoring force exerted by the spring 21.

The feature whereby the plate 24 is located in an inclined position with respect to the adjacent edge of the slider 7 facilitates the ready downward or upward displacement of the plate without excessive frictional resistance from the slider edge. Thus, after the initial downward movement of the plate 24 the latter will be somewhat spaced away from the adjacent edge of the slider 7 and the latter cannot therefore exert any frictional resistance on the movement of the plate 24. It will be appreciated that the set back forces effective on the slider 7 effectively lock the slider against the slider housing portion 5b and therefore prevent the slider 7 from being pressed against the plate 24, so as to inhibit its motion.

In designing the arming plate, the recess in which it is displaceable and the location of the abutment pins care must be taken to ensure that locking of the plate with respect to the pins or with respect to one pin and an adjacent wall of the recess does not take place during the displacement of the plate. Thus, if the plate has an excessive freedom for angular motion a situation can arise whereby the plate abuts both pins with two respective serrations of opposing slopes and under these circumstances the plate will be locked and is therefore incapable of functioning effectively. In order to avoid such an eventuality it is necessary to restrict the maximum angle by which the plate can tilt and this is done by causing the plate to slide in a guideway whose dimensions together with those of the plate limit the angle of tilt of the plate by the required amount to prevent locking. The maximum value which this angle can take can be theoretically calculated.

At the same time measures must be taken to ensure that locking does not take place as a result of the contact between one edge of the plate with the side wall of the guideway on the one hand and the opposite serrated edge of the plate with a pin on the other hand. In order to ensure this the design of the plate and the guideway must be so conceived that the vertical distance between the pin and said lowermost edge of the plate when disposed in contact with the side wall of the guideway exceeds a certain minimum value.

Reference will now be made to FIGS. 5a and 5b of the drawings for a theoretical consideration of the dimensional relationship which must be satisfied so as to avoid locking.

There will first be considered, with reference to FIG. 5a, the problem of locking of the plate between the pins.

As seen in FIG. 5a
$\gamma$ = angle of slope of the plate with respect to the vertical
$\phi$ = serration angle
$B_1$ = plate width (between serrations)
$R$ = pin radius
$h_r$ = theoretical serration depth
$f$ = spacing between pins Then it can be shown that locking of this kind can be avoided if the maximum angle of slope $\gamma$ is so restricted that $$\cos \gamma \cot \phi - \sin \gamma > [B_1 - h_r + R(1 + 1/\cos \phi)](\cot \phi/f) \quad (1)$$

There will now be considered, with reference to FIG. 5b of the drawings the problem of plate locking between one pin and the side wall of the guideway. This locking will take place where 1 which is the distance from the pin involved to the lower edge of the plate is less than 1 min.

As seen from FIG. 5b
$L$ = length of plate
$B_2$ = plate width (lower edge)
$\mu$ = coefficient of friction
$\mu°$ = angle of friction corresponding to $\mu$
$D$ = Pin diameter = $2R$
then the condition that locking does not take place is given by $$1 \text{ min} > \tfrac{1}{2} (B_1 \tan \delta - B_2 \mu) \quad (2)$$

where $\delta = \phi + \gamma + \mu°$

In order to ensure that both relationships (1) and (2) are satisfied a max value for $\gamma$ is deductable whereby $$\tan \gamma \max = [b + f - (B_1 + B_2 + D)/(2 \text{ 1 min})] \quad (3)$$

In a practical example where
$\gamma = 40°$
$B_1 = 8$ mm
$h_r = 1.4$ mm
$R = 0.75$ mm f = 8.8 mm
L = 37 mm
1 min = 7.5 mm.

With these values it can be shown that with $\gamma$ max $\cong$ 3° and 1 min $\cong$ 7mm locking is avoided.

The particular design of the plate and its guideway has been determined so as to meet the above referred to theoretical requirements. Thus, in order to ensure that the angle of tilt does not exceed said maximum value whilst at the same time ensuring that the lower edge of the plate cannot come into contact with the guideway wall before said minimum distance is reached the special design of plate and guideway shown in FIG. 2 of the drawings is adopted. Thus, as can be seen the guideway consists of an upper wide portion and a lower narrow portion. The upper portion 25 of the plate is widened so that when the plate slides in the guideway it cannot achieve an angle of tilt greater than said maximum allowable value. On the other hand the lower edge of the plate is disposed in the widened portion of the guideway as long as the distance between the pin and the lower edge is less than the minimum value and as long as the lower edge is located in this widened portion of the guideway contact between the lower edge and the wall of the guideway cannot take place. By the time, however, that the lower edge of the plate has entered the narrow portion of the guideway the distance between the pin and the lower edge exceeds said minimum value and locking can therefore not occur.

Whilst in the specific embodiment referred to above the abutment system consists of a pair of serrated edges of the arming plate and a pair of fixed abutment pins other forms of abutment systems can be envisaged whose function is to ensure that the longitudinal displacement of the plate is accompanied by a transverse displacement thereof. Thus, for example, the plate can be provided with a longitudinal slot whose inner edges are serrated in a manner similar to the serration of the outer edges of the plate described above, a pin being located within this slot. Alternatively, the plate can be provided with a pair of outwardly extending abutment members which are designed to abut respectively a pair of serrated edges which is fixed. Thus, in this case the abutment members moved together with the plate whilst the serrated edges remain fixed. In a still further alternative embodiment the serrated edges can be replaced by fixed abutments such as projecting pins or the like.

Finally, whilst the device in accordance with the invention has been specifically described in connection with a set back arming device for use in a shell fuse other applications of this device can be readily envisaged particularly in connection with shell or bomb fuses. Thus, the device can be used to provide an indication of the depth to which a shell or bomb penetrates a target (utilizing for this purpose the displacement of the plate-like member as a result of the negative acceleration developed) and for example when the degree of penetration has reached a desired level the device can be used to initiate the detonation of the shell.

We claim:

1. A device for providing an indication of the distance travelled by an object under conditions of linear acceleration comprising:
   a. a housing member adapted to be fixed to the object and having a longitudinal slot elongated in the direction of the acceleration;
   b. a plate member; and means mounting the plate member for displacement in the slot in the longitudinal direction and for oscillation in the slot through a limited angle about an axis perpendicular to the longitudinal direction of the slot;
   c. spring means for biasing the plate member in the slot in the longitudinal direction;
   d. cooperable abutment means fixedly mounted on each of the members and located at least partially in the longitudinal slot for causing the plate member to oscillate about said axis as the plate member is displaced in the slot in the longitudinal direction whereby a predetermined acceleration force acting on the plate member against the biased action of the spring means for a predetermined period of time displaces the plate member through a predetermined distance against the bias of the spring means.

2. A device according to claim 1 wherein the abutment means comprises a pair of parallel, spaced, elongated serrated edges formed on one of the members and a pair of spaced abutments carried by the other member, each of the abutments being adapted to alternatingly abut the respective serrated edges when the plate member is displaced in the slot in the longitudinal direction.

3. A fuze arming device for a projectile operated by set-back forces developed during the filing of a projectile comprising:
   a. a fuze housing member adapted to be fixed to the projectile and having a longitudinal slot elongated in the direction of the set-back forces;
   b. a plate member; and means mounting the plate member for displacement in the slot in the longitudinal direction and for oscillation in the slot through a limited angle about an axis perpendicular to the longitudinal direction of the slot;
   c. spring means for biasing the plate member in the slot in the longitudinal direction against movement in response to the set-back forces;
   d. cooperable abutment means fixedly mounted on each of the members and located at least partially in the longitudinal slot for causing the plate member to oscillate about said axis as it is displaced in the slot in the longitudinal direction; and
   e. retaining means made effective when the plate member is displaced in the slot against the spring means through a predetermined distance for retaining the plate member against the bias of the spring means.

4. A fuze arming device according to claim 3 wherein the abutment means comprises a pair of spaced, parallel, elongated serrated edges formed on one of the members, and a pair of spaced abutments carried by the other member, each of the abutments being adapted to alternatingly abut the respective serrated edges when the plate member is displaced in the slot in the longitudinal direction.

5. A fuze arming device according to claim 4 including a slider mounted on the housing member for slideable movement in a direction transverse to the direction of displacement of the plate member and into its path of displacement; and a spring resiliently urging the slider into the path of displacement of the plate member; the plate member blocking movement of the slider by the spring until after the plate member is displaced through said predetermined distance.

6. A fuze arming device according to claim 5 wherein the dimension of the slot in the direction of slideable movement of the slider is greater than the thickness of the plate member for causing the latter to be tilted in the slot by the spring acting on the slider as the plate member is displaced through said predetermined distance.

7. A fuze arming device according to claim 6 wherein the plate member has a top edge and the retaining means comprises a fixed abutment positioned so that the top edge of the plate member can engage behind the abutment only after the plate member is displaced through said predetermined distance and is tilted further by the action of the spring biased slider.

8. A fuze arming device according to claim 7 wherein the plate member has a pair of parallel serrated edges, and the pair of abutments are pins carried by the housing member.

* * * * *